United States Patent
Jen et al.

(10) Patent No.: US 9,807,316 B2
(45) Date of Patent: Oct. 31, 2017

(54) METHOD FOR IMAGE SEGMENTATION

(71) Applicant: HTC Corporation, Taoyuan (TW)

(72) Inventors: Cheng-Lung Jen, Taoyuan (TW);
Pol-Lin Tai, Taoyuan (TW); Jing-Lung Wu, Taoyuan (TW); Hsin-Ti Chueh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 47 days.

(21) Appl. No.: 14/838,378

(22) Filed: Aug. 28, 2015

(65) Prior Publication Data

US 2016/0073040 A1 Mar. 10, 2016

Related U.S. Application Data

(60) Provisional application No. 62/045,572, filed on Sep. 4, 2014.

(51) Int. Cl.
| | |
|---|---|
| *H04N 5/272* | (2006.01) |
| *H04N 5/232* | (2006.01) |
| *H04N 5/262* | (2006.01) |
| *G06K 9/00* | (2006.01) |
| *G06K 9/62* | (2006.01) |
| *G06T 7/10* | (2017.01) |

(52) U.S. Cl.
CPC ......... *H04N 5/272* (2013.01); *G06K 9/00362* (2013.01); *G06K 9/6201* (2013.01); *G06T 7/10* (2017.01); *H04N 5/23219* (2013.01); *H04N 5/23293* (2013.01); *H04N 5/2621* (2013.01)

(58) Field of Classification Search
CPC .................................. H04N 5/272; G06T 7/10
See application file for complete search history.

(56) References Cited

U.S. PATENT DOCUMENTS

| | | | | |
|---|---|---|---|---|
| 6,388,707 B1 * | 5/2002 | Suda | ................. | H04N 5/23212 |
| | | | | 348/333.03 |
| 7,515,193 B2 * | 4/2009 | Honda | ................. | H04N 7/147 |
| | | | | 348/333.05 |

(Continued)

FOREIGN PATENT DOCUMENTS

| | | |
|---|---|---|
| CN | 101228552 A | 7/2008 |
| CN | 103124328 A | 5/2013 |

(Continued)

OTHER PUBLICATIONS

Corresponding European Search Report that these art references were cited dated Jan. 4, 2016.

(Continued)

*Primary Examiner* — Roberto Velez
*Assistant Examiner* — Cynthia Segura
(74) *Attorney, Agent, or Firm* — CKC & Partners Co., Ltd.

(57) ABSTRACT

An image segment method is provided in this disclosure. The method is suitable for an electronic apparatus including a first camera and a motion sensor. The method includes steps of: providing at least one pre-defined model mask; fetching pose data from the motion sensor, the pose data being related to an orientation or a position of the first camera; adjusting one of the at least one pre-defined model mask into an adaptive model mask according to the pose data; and, extracting an object from an image captured by the first camera according to the adaptive model mask.

20 Claims, 8 Drawing Sheets

(56) References Cited

U.S. PATENT DOCUMENTS

| | | | |
|---|---|---|---|
| 7,580,066 B2* | 8/2009 | Shirakawa | G11B 27/036 348/207.2 |
| 9,325,903 B2* | 4/2016 | Kim | H04N 5/23293 |
| 9,398,251 B2* | 7/2016 | Choi | H04N 7/147 |
| 9,648,242 B2* | 5/2017 | Matsutani | H04N 5/23293 |
| 2002/0080251 A1* | 6/2002 | Moriwaki | H04N 1/3871 348/231.6 |
| 2003/0117501 A1* | 6/2003 | Shirakawa | H04N 5/2251 348/218.1 |
| 2004/0022435 A1 | 2/2004 | Ishida | |
| 2005/0036044 A1* | 2/2005 | Funakura | G06K 9/00228 348/239 |
| 2005/0104848 A1* | 5/2005 | Yamaguchi | G06F 1/1626 345/156 |
| 2005/0225566 A1* | 10/2005 | Kojo | G06T 13/80 345/629 |
| 2006/0044396 A1* | 3/2006 | Miyashita | H04N 5/2252 348/207.99 |
| 2007/0019000 A1* | 1/2007 | Motomura | G06F 1/1626 345/619 |
| 2007/0057866 A1* | 3/2007 | Lee | H04M 1/0218 345/1.1 |
| 2007/0223830 A1* | 9/2007 | Ono | G06T 11/60 382/254 |
| 2008/0124005 A1* | 5/2008 | Lin | G06F 3/017 382/313 |
| 2010/0007665 A1* | 1/2010 | Smith | G06T 13/40 345/473 |
| 2011/0141219 A1* | 6/2011 | Yeh | G06T 7/20 348/14.02 |
| 2011/0164105 A1* | 7/2011 | Lee | H04N 7/142 348/14.02 |
| 2011/0193993 A1* | 8/2011 | Yeom | H04N 5/232 348/231.3 |
| 2011/0249961 A1* | 10/2011 | Brunner | H04N 5/23216 396/213 |
| 2013/0120602 A1* | 5/2013 | Huang | H04M 1/72522 348/218.1 |
| 2013/0235223 A1* | 9/2013 | Park | H04N 5/23222 348/218.1 |
| 2013/0235224 A1* | 9/2013 | Park | H04N 5/23222 348/218.1 |
| 2013/0314604 A1* | 11/2013 | Tada | H04N 9/643 348/649 |
| 2013/0329072 A1 | 12/2013 | Zhou et al. | |
| 2014/0184739 A1 | 7/2014 | Kuo | |
| 2014/0232906 A1 | 8/2014 | Ha et al. | |
| 2015/0237268 A1* | 8/2015 | Vaiaoga | H04N 5/247 348/218.1 |
| 2017/0134643 A1* | 5/2017 | Kim | H04N 5/23219 |

FOREIGN PATENT DOCUMENTS

| | | |
|---|---|---|
| CN | 103685909 A * | 3/2014 |
| EP | 2595374 | 5/2013 |
| TW | 200832237 A | 8/2008 |
| TW | 200924514 A | 6/2009 |
| TW | 201316755 A | 4/2013 |
| TW | 201332351 A | 8/2013 |
| TW | 201349131 A | 12/2013 |
| WO | 01/35641 A1 | 5/2001 |

OTHER PUBLICATIONS

Corresponding Taiwanese Office Action that these art references were cited dated Jan. 12, 2016.

* cited by examiner

METHOD FOR IMAGE SEGMENTATION

CROSS-REFERENCE TO RELATED APPLICATION

This application claims the priority benefit of U.S. Provisional Application Ser. No. 62/045,572, filed Sep. 4, 2014, the full disclosures of which are incorporated herein by reference.

FIELD OF INVENTION

The disclosure relates to an image processing method and an electronic apparatus thereof. More particularly, the disclosure relates to an image processing method for dynamic image segment.

BACKGROUND

To develop more kinds of digital visual effects based on a selfie image, extracting the foreground human object from the selfie image is an essential technique. In general, the foreground human object is recognized from an image by some facial identification algorithms (e.g., edge detections, facial features detections, etc).

Currently, a mobile phone usually includes two cameras, which are a front camera and a back camera. The front camera is disposed on the same side with a display module and utilized mainly for selfie shooting, video-calling and some other photography functions related to the user. The back camera is disposed on the opposite side and utilized mainly for capturing an image of other people, landscapes or some background sceneries. When the user holds the mobile phones in a general case, the front camera faces toward to the user himself. If the foreground human object captured by the front camera could be extracted in real time, the foreground human object can be combined into another image for some visual effects or specific purposes. Moreover, if the foreground human object could be extracted in real time, the visual effect involving the foreground human object can be reflected on a user interface in real time, such that the user interface (about adjusting the visual effect) can be more straightforward and simple to manipulate.

However, it takes a certain computation time to extract the foreground human object from a background of the image. A delay time will exists in traditional procedures of extracting the foreground human object. Based on current identification algorithms, it is hard to extract the foreground human object in real time from the background. Therefore, the digital visual effects based on selfie images can not be reflected in real time.

SUMMARY

An embodiment of this disclosure is to develop an adaptive model-based human segment feature to automatically separate an object (e.g., a human) and a background of an image in real-time, during stages of previewing, snap-shooting, recording and off-line editing related to the image. In other words, the adaptive model-based human segment feature is able to extract the object in an efficient way. Therefore, visual effects involving the object can be applied, edited or achieved at each image frame. Therefore, the user can dynamically observe the variance of the visual effects involving the object.

An aspect of the disclosure is to provide a method, which is suitable for an electronic apparatus including a first camera and a motion sensor. The method includes steps of: providing at least one pre-defined model mask; fetching pose data from the motion sensor, the pose data being related to an orientation or a position of the first camera; adjusting one of the at least one pre-defined model mask into an adaptive model mask according to the pose data; and, extracting an object from an image captured by the first camera according to the adaptive model mask.

Another aspect of the disclosure is to provide a method, which is suitable for an electronic apparatus including a first camera and a motion sensor. The method includes steps of: capturing a first image by the first camera; estimating an object pose from the first image according to an identification algorithm; fetching pose data from the motion sensor, the pose data being related to a position or an orientation of the first camera when the first image is captured; analyzing a camera pose according to the pose data; tracking a relative motion according to the camera pose and the object pose; providing a pre-defined model mask; adjusting the pre-defined model mask into an adaptive model mask according to the relative motion; and, adaptively extracting the object from the first image according to the adaptive model mask.

Another aspect of the disclosure is to provide a method, which is suitable for an electronic apparatus including a first camera and a motion sensor. The method includes steps of: providing a first model mask; capturing a first image by the first camera, the first image comprising an object; extracting the object from the first image according to the first model mask; capturing a second image by the first camera; fetching pose data from the motion sensor, the pose data being related to a position or an orientation of the first camera when the second image is captured; tracking a relative motion from the first image to the second image according to the pose data and the object from the first image; dynamically providing a second model mask according to the relative motion; and, adaptively extracting the object from the second image according to the second model mask.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
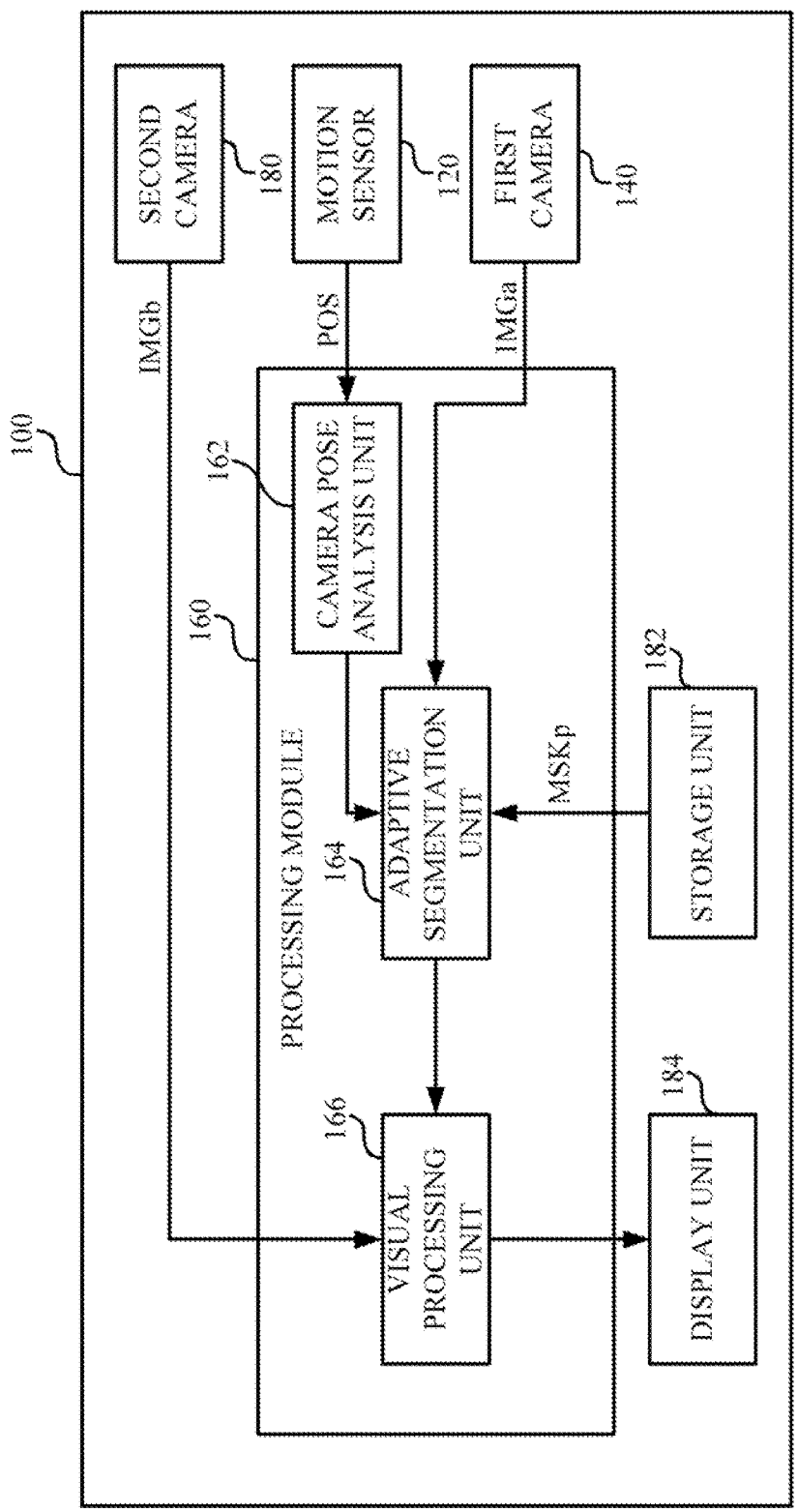
FIG. 1 is a schematic diagram illustrating an electronic apparatus according to an embodiment of the disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
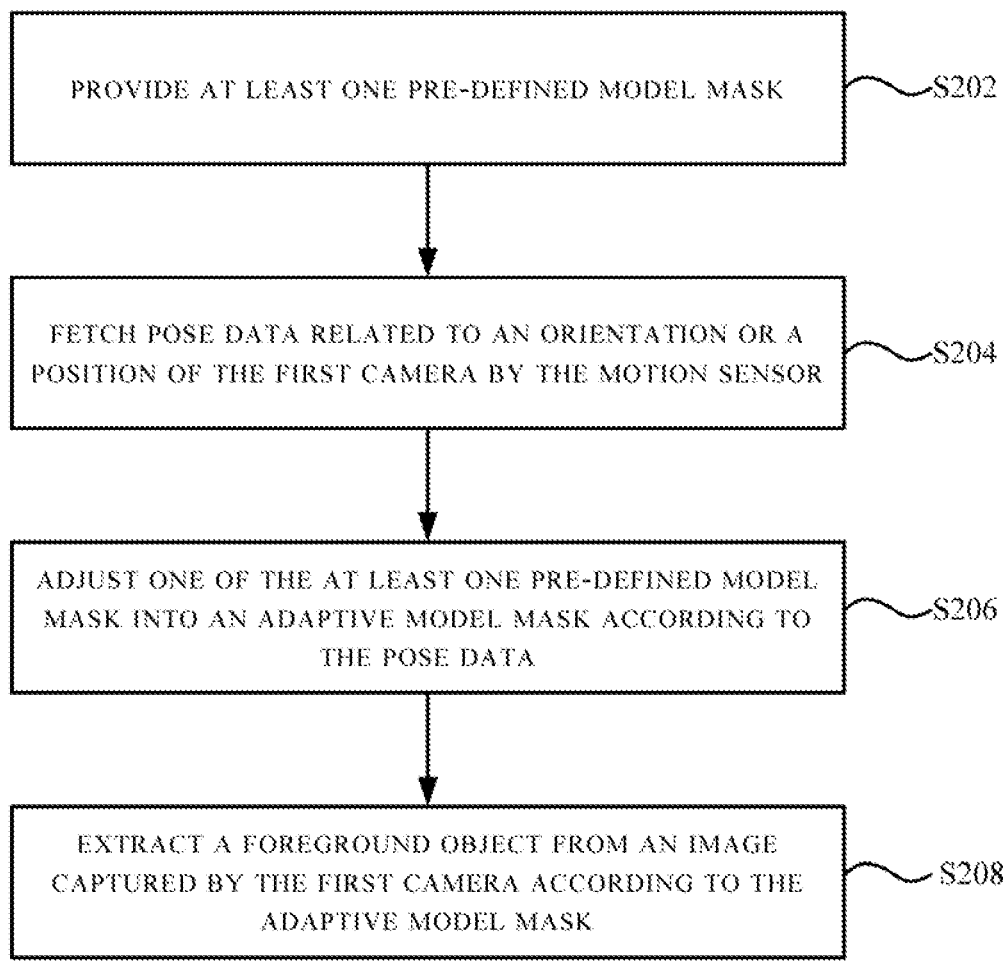
FIG. 2 is a flow chart diagram illustrating the method for segmenting an object from an image with an adaptive model mask according to an embodiment of the disclosure.

Reference is made to FIG. 1, which is a schematic diagram illustrating an electronic apparatus 100 according to an embodiment of the disclosure. As shown in FIG. 1, the electronic apparatus 100 includes a motion sensor 120, a first camera 140 and a processing module 160. The processing module 160 is coupled to the motion sensor 120 and the first camera 140. The electronic apparatus 100 is suitable to perform a method for segmenting an object from an image with an adaptive model mask. Reference is also made to FIG. 2, which is a flow chart diagram illustrating the method 200 for segmenting an object from an image with an adaptive model mask according to an embodiment of the disclosure. In some embodiments the object segmented from the image is a foreground object (e.g., a human face, a face portrait, a human body, a group of people, a target near the first camera 140). In some other embodiments, the object segmented from the image is a target object in the background (e.g., a mountain, a beach shore, a car, etc)

The motion sensor 120 and the first camera 140 are both disposed in the electronic apparatus 100. Therefore, when the electronic apparatus 100 is moved (and the first camera 140 is moved correspondingly), the motion sensor 120 is configured to detect the movement of the electronic apparatus 100 as well as the first camera 140. In some embodiments, the motion sensor 120 includes a gyroscope (i.e., g-sensor), an inertia sensor and/or an electrical compass. The motion sensor 120 is configured for generating pose data POS such as acceleration, rate of turn, rotational torque and earth-magnetic field strength on the electronic apparatus 100.

Figure 3:
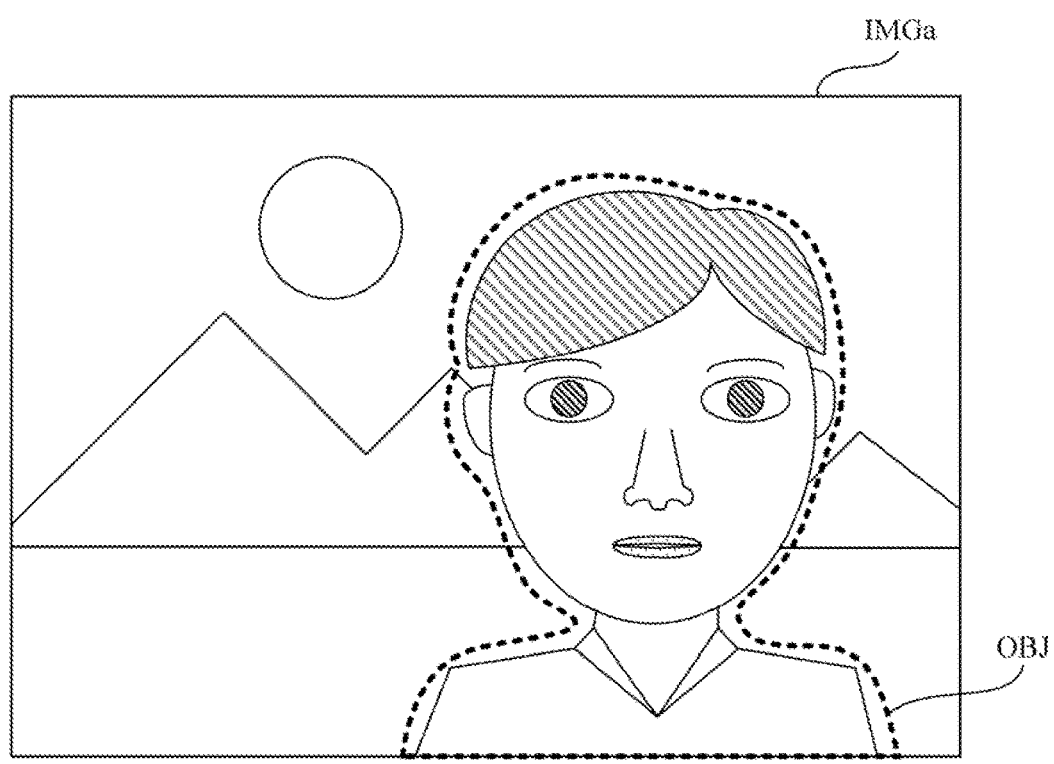
FIG. 3 is a schematic diagram illustrating the image captured by the first camera according to an example.

The first camera 140 is configured to capture an image IMGa. In some embodiments, the first camera 140 is a front camera disposed on a front side (usually disposed on the same side with the display unit 184) of the electronic apparatus 100. Therefore, the image IMGa captured by the first camera 140 is usually a selfie image. Reference is made to FIG. 3, which is a schematic diagram illustrating the image IMGa captured by the first camera 140 according to an example.

As shown in FIG. 3, there is an object OBJ (which is a foreground object in this embodiment) existed within the image IMGa. In this embodiment the foreground object is a human portrait because the image IMGa is a selfie image toward the user holding the electronic apparatus 100. However, the foreground object OBJ is not limited to the user. In some other embodiments, the foreground object OBJ can be multiple persons (e.g., the user and his friends standing beside him) or a person and his belongings (e.g., the user and a product holding in his hand), etc.

To extract the foreground object OBJ from the image IMGa, there are some identification algorithms (e.g., object identification based on depth information, human feature identification) for distinguishing the foreground object OBJ and separating the foreground object OBJ from the background of the image IMGa. However, the identification algorithms will take a lot of computation time. Therefore, the result of the foreground object OBJ can not be quickly generated (or in real time) when the image IMGa is captured.

Figure 4A:
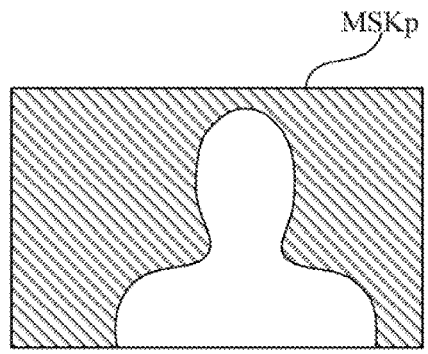
FIG. 4A is a schematic diagram illustrating a pre-defined mask according to an embodiment of the disclosure.

In order to reduce the delay time of extracting the foreground object OBJ from the image IMGa, a pre-defined mask can be applied to the image IMGa. Reference is also made to FIG. 4A, which is a schematic diagram illustrating a pre-defined mask MSKp according to an embodiment of the disclosure. When the pre-defined mask MSKp is applied to the image IMGa, the image IMGa passing through a blank part of the pre-defined mask MSKp is extracted as the foreground object OBJ, and the image IMGa in a shadowed part of the pre-defined mask MSKp is blocked. The pre-defined mask MSKp is shaped as a general prototype of a human portrait in common selfie images based on experiences, machine-learning or statistics.

However, the pre-defined mask MSKp will not be precise enough for all situations, especially when the user moves the electronic apparatus 100 and the first camera 140 in different ways (moving the electronic apparatus 100 upward/downward, or rotating the electronic apparatus 100 to the right side or to the left side). If the electronic apparatus 100 always adopts the same pre-defined mask MSKp to extract the foreground object OBJ from the image IMGa, the extraction result of the foreground object OBJ will be not precise enough for further visual effects (e.g., image blending, image enhancement, etc).

Therefore, the electronic apparatus 100 execute the method 200 shown in FIG. 2 for adaptively extracting the foreground object from the image IMGa. The details of the method 200 are explained in following paragraphs. As shown in FIG. 1, the processing module 160 includes a camera pose analysis unit 162, an adaptive segmentation unit 164 and a visual processing unit 166. In some embodiments, the processing module 160 is realized by a general processor, a graphic processer, a digital signal processor (DSP), or any equivalent processing circuit. The camera pose analysis unit 162, the adaptive segmentation unit 164 and the visual processing unit 166 are realized by software programs, instructions or procedures executed by the processing module 160.

In this embodiment shown in FIG. 1, the electronic apparatus 100 further includes a second camera 180, a storage unit 182 and a display unit 184. The second camera 180, the storage unit 182 and the display unit 184 are also coupled to the processing module 160.

As shown in FIG. 2, step S202 is executed for providing at least one pre-defined mask (e.g., the pre-defined mask MSKp shown in FIG. 4A). The pre-defined mask MSKp is stored in the storage unit 182. The pre-defined mask MSKp is shaped as a general prototype of a human portrait in common selfie images and designed based on experiences, machine-learning or statistics.

The pre-defined mask MSKp demonstrated in FIG. 4A is only an example about a general prototype of the human portrait. The pre-defined model mask MSKp is shaped corresponding to a front view of a human, the front view at least covers a head and an upper body of the human. As the general prototype of the pre-defined mask MSKp, the right and the left halves of the pre-defined model mask MSKp are substantially mirrored to each other.

However, the electronic apparatus 100 can store plural pre-defined masks (not shown in figures) in the storage unit 182. The pre-defined model masks are provided and shaped in different types of humans. For example, the pre-defined model masks are differentiated by a hair style (e.g., long hairs, short hairs, curly hairs), a weight (e.g., fat, slime or normal), a size (e.g., due to the human is near or far from the first camera 140) or a skeleton topology, etc. In other words, the pre-defined model masks are not limited to the pre-defined mask MSKp shown in FIG. 4A. In other embodiments, the pre-defined model mask is shaped corresponding to a front view of multiple people. In this case, the front view at least covers heads and upper bodies of these people.

Step S204 is executed for fetching pose data POS from the motion sensor 120 by the camera pose analysis unit 162. The pose data POS is related to an orientation and/or a position of the first camera 140. In this case, the pose data POS is fetched at the time that the image IMGa is captured by the first camera 140. In an embodiment, the pose data POS fetched from the motion sensor 120 includes a rotation angle (along a horizontal direction) of the orientation of the first camera 140 at the time that the image IMGa is captured (e.g., the first camera 140 is moved to a right side relative to the foreground object OBJ, or moved to a left side relative to the foreground object OBJ). In another embodiment, the pose data POS fetched from the motion sensor 120 includes a shifting distance of the position (indicating that the first camera 140 is hold at a higher level or a lower level relative to the foreground object OBJ) of the first camera 140 at the time that the image IMGa is captured. In still another embodiment, the pose data POS fetched from the motion sensor 120 includes a rotation angle of the orientation of the first camera 140 and also a shifting distance of the position of the first camera 140 at the time that the image IMGa is captured.

Figure 4B:
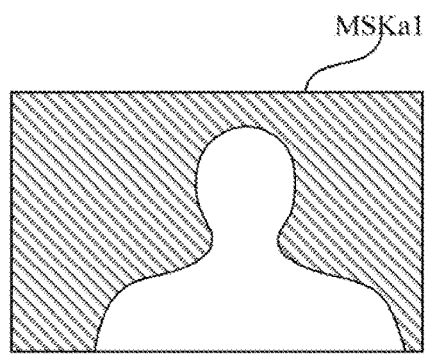
FIG. 4B, FIG. 4C and FIG. 4D are schematic diagram illustrating three different adaptive model masks under different situation according to the embodiment.
Figure 4C:
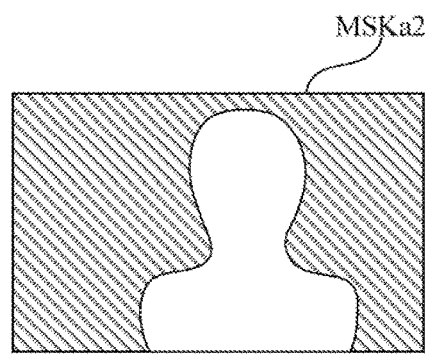
Figure 4D:
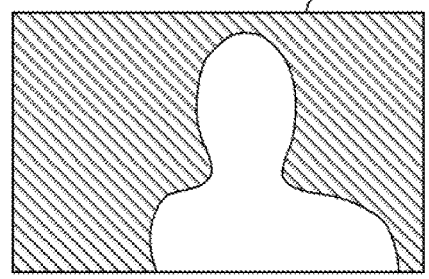

Step S206 is executed for adjusting one of the at least one pre-defined model mask (e.g., the pre-defined mask MSKp shown in FIG. 4A) into an adaptive model mask according to the pose data POS (which includes an orientation and/or a position of the first camera 140). Reference is also made to FIG. 4B, FIG. 4C and FIG. 4D, which are schematic diagrams illustrating three different adaptive model masks MSKa1~MSKa3 under different situations according to the embodiment.

If the analysis of the pose data POS indicates that the first camera 140 is moved downward (the pose data POS indicates that the first camera 140 is shooting from a lower position relative to the foreground object OBJ), the pre-defined mask MSKp is adjusted into the adaptive model mask MSKa1 shown in FIG. 4B. In this case, a bypassing area of the adaptive model mask MSKa1 is larger in the lower region and narrower in the upper region, such that the adaptive model mask MSKa1 is more suitable for an image shooting from a lower position relative to the foreground object OBJ.

If the analysis of the pose data POS indicates that the first camera 140 is moved upward (the pose data POS indicates that the first camera 140 is shooting from a higher position relative to the foreground object OBJ), the pre-defined mask MSKp is adjusted into the adaptive model mask MSKa2 shown in FIG. 4C. In this case, a bypassing area of the adaptive model mask MSKa2 is larger in the upper region and narrower in the lower region, such that the adaptive model mask MSKa2 is more suitable for an image shooting from a higher position relative to the foreground object OBJ.

If the analysis of the pose data POS indicates that the first camera 140 is moved to the right side (the pose data POS indicates that the first camera 140 is shooting from a right side relative to a central axis in front of the foreground object OBJ), the pre-defined mask MSKp is adjusted into the adaptive model mask MSKa3 shown in FIG. 4D. In this case, a bypassing area of the adaptive model mask MSKa3 is larger on the right side and narrower on the left side, such that the adaptive model mask MSKa3 is more suitable for an image shooting from a right side relative to a central axis in front of the foreground object OBJ. Similarly, if the first camera 140 is rotated to the left side, the pre-defined mask MSKp will be adjusted into another adaptive model mask (not shown in figures).

Based on aforesaid embodiments, the adaptive model masks MSKa1~MSKa3 is generated by the adaptive segmentation unit 164 from the pre-defined mask MSKp according to the pose data POS. Step S308 is executed for extracting a foreground object OBJ from the image IMGa captured by the first camera 140 according to the adaptive model mask MSKa1, MSKa2 or MSKa3. Therefore, the adaptive model masks MSKa1~MSKa3 can provide higher preciseness while extracting the foreground object OBJ and also higher efficiency of computing the foreground object OBJ (in comparison with indentifying the foreground object OBJ merely by an identification algorithm).

After the foreground object OBJ (e.g., the user's portrait) is extracted by the adaptive segmentation unit 164, the foreground object OBJ can be utilized in different types of visual effects, such as an image blending effect or other effects. As shown in FIG. 1, the electronic apparatus 100 further includes a second camera 180. In some embodiments of the method 200, a step is further executed for capturing another image IMGb by the second camera 180 simultaneous to the image IMGa captured by the first camera 140.

In some embodiments, the first camera 140 and the second camera 180 are disposed on opposite surfaces of the electronic apparatus 100. The second camera 180 is a back camera (or regarded as the main camera) disposed on the back side of the electronic apparatus 100. The second camera 180 is mainly utilized to capture the scenario of interest in front of the user.

In some embodiments of the method 200, another step is further executed for blending the foreground object OBJ from the image IMGa captured by the first camera 140 into the image IMGb captured by the second camera 180. Therefore, the foreground object OBJ (e.g., the user's portrait) can be merged into the image IMGb captured by the second camera 180 (e.g., the main camera). The outcome of this blended image (formed by the foreground object OBJ from the image IMGa overlapping on a background of the image IMGb captured by the second camera 180) can be displayed on the display unit 184 of the electronic apparatus 100 as a preview image in real time. Aforesaid application is really useful when the user is taking a photograph, and the user want to combine his selfie with the image IMGb captured by the second camera 180. Aforesaid method 200 and the electronic apparatus 100 can provide the preview image (consisting of the foreground object OBJ from the image IMGa and the image IMGb) in real time without complex computation of identification algorithms.

In aforesaid embodiments, the adaptive model mask MSKa1, MSKa2 or MSKa3 is decided according to the pose data POS (which indicates the position and/or the orientation of the first camera 140). However, the disclosure is not limited thereto. Another embodiment of the disclosure is about forming the adaptive model mask based on a relative motion between the first camera 140 and the foreground object OBJ.

Figure 5:
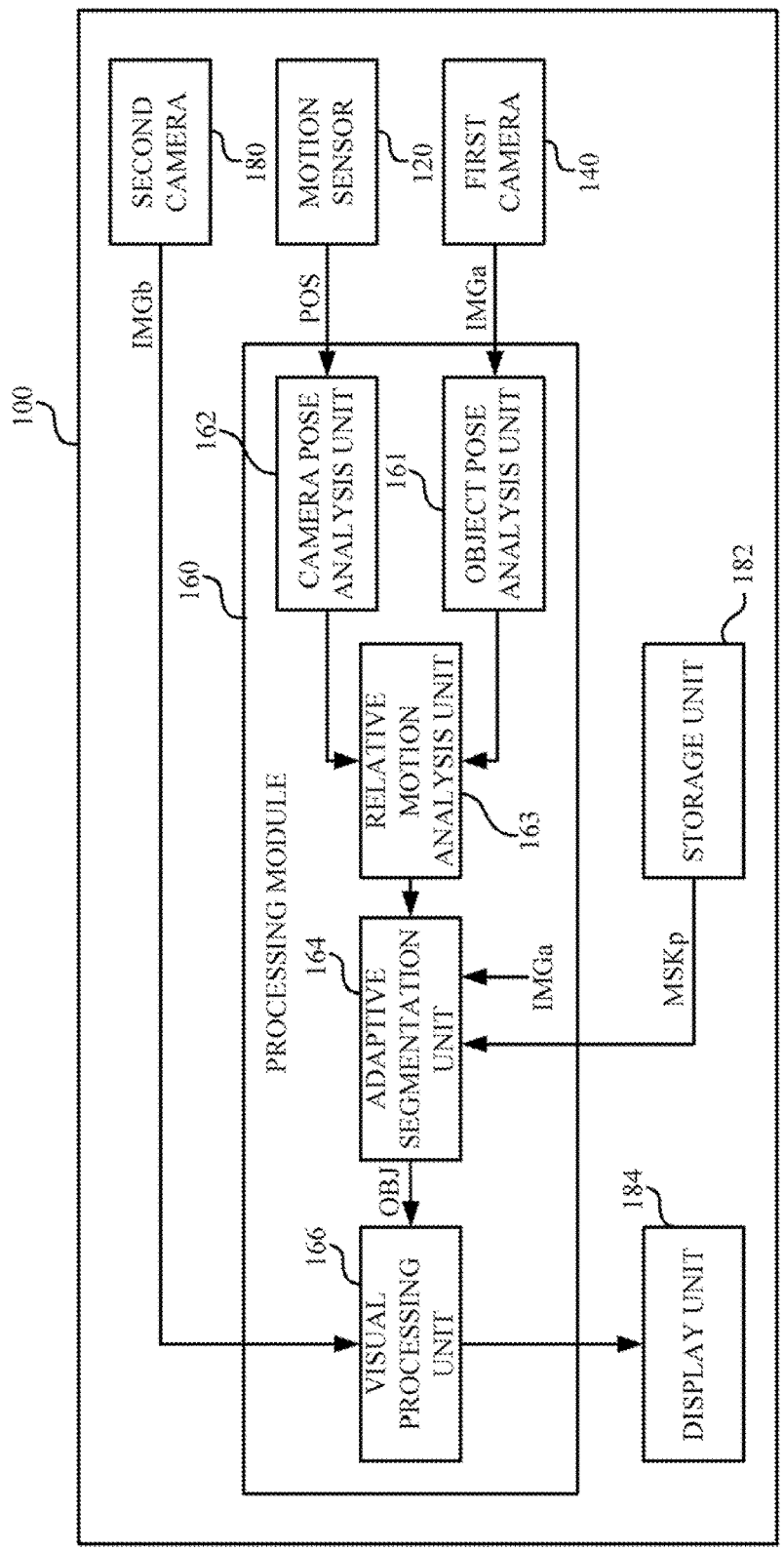
FIG. 5 is a schematic diagram illustrating an electronic apparatus according to another embodiment of the disclosure.

Reference is also made to FIG. 5, which is a schematic diagram illustrating an electronic apparatus 100 according to another embodiment of the disclosure. In the embodiment of FIG. 5, the electronic apparatus 100 includes a motion sensor 120, a first camera 140, a processing module 160, a second camera 180, a storage unit 182 and a display unit 184. In this embodiment of FIG. 5, the processing module 160 includes an object pose analysis unit 161, a camera pose analysis unit 162, a relative motion analysis unit 163, an adaptive segmentation unit 164 and a visual processing unit 166.

In some embodiments, the processing module 160 is realized by a general processor, a graphic processer, a digital signal processor (DSP), or any equivalent processing circuit. The object pose analysis unit 161, the camera pose analysis unit 162, the relative motion analysis unit 163, the adaptive segmentation unit 164 and the visual processing unit 166 are realized by software programs, instructions or procedures executed by the processing module 160.

Figure 6:
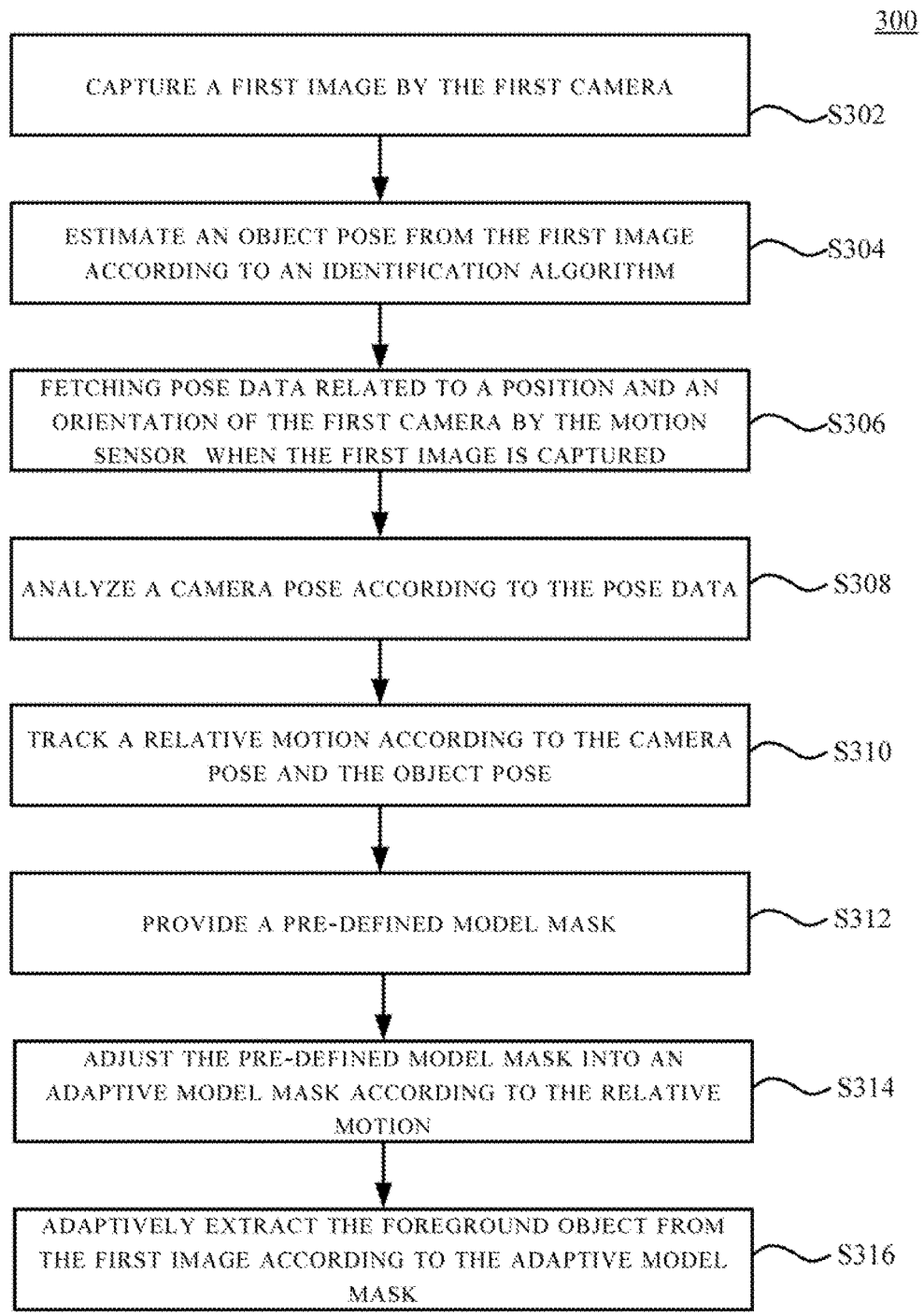
FIG. 6 is a flow chart diagram illustrating the method for segmenting an object from an image with an adaptive model mask according to an embodiment of the disclosure.

The processing module 160 is coupled to the motion sensor 120 and the first camera 140. The electronic apparatus 100 is suitable to perform a method for segmenting an object from an image with an adaptive model mask. Reference is also made to FIG. 6, which is a flow chart diagram illustrating the method 300 for segmenting an object from an image with an adaptive model mask according to an embodiment of the disclosure. The method 300 in FIG. 6 is suitable to be utilized on the electronic apparatus 100 shown in FIG. 5.

As shown in FIG. 6, step S302 is executed for capturing an image IMGa (referring to FIG. 3) by the first camera 140. Step S304 is executed for estimating an object pose from the image IMGa according to an identification algorithm by the object pose analysis unit 161.

In the step S304, the object pose analysis unit 161 is configured to locate a human-related object OBJ (e.g., a human face) in the image IMGa. Some facial features (eyes, nose, month, etc) are detected within the image IMGa and a size of the human head shape is evaluated by an edge detection process in order to locate the human-related object. In addition, a position and a contour of the human face can be optimally matched using statistics with facial color and robust feature according to facial information. Based on the consistency of face location and human body, the body position is estimated using human skeleton topology and then the human shape can be decomposed with color texture statistics. Accordingly, the object pose analysis unit 161 is utilized to examine the object pose, which indicates the position, the gesture and/or the orientation of the human-related object (i.e., the human portrait). In addition, the object pose is estimated and tracked dynamically over time for following analysis of relative motion between the user and the camera. In this embodiment, the human-related object OBJ is a foreground object in the image IMGa.

Step S306 is executed for fetching pose data POS from the motion sensor 120. The pose data POS is related to a position and/or an orientation of the first camera 140 when the image IMGa is captured. Step S308 is executed for analyzing a camera pose according to the pose data POS by the camera pose analysis unit 162. This camera pose analysis unit 162 analyzes the camera pose by sequentially computing the pose data POS from the motion sensor 140 with statistics and removing noise to determine the position and/or orientation of the first camera 140. In addition, the camera pose is estimated and tracked dynamically over time for following analysis of relative motion between the user and the camera.

Step S310 is executed for tracking a relative motion according to the camera pose (from the camera pose analysis unit 162) and the object pose (from the object pose analysis unit 161) by the relative motion analysis unit 163. With the information integrated with the object pose (including the position/orientation of the human face and the human body shape) and the camera pose (including the position/orientation of the first camera 140), the relative motion analysis unit 163 is configured to track the relative motion between the object OBJ (i.e., the human-related object) and the first camera 140 in real time. The relative motion includes the relationship that the selfie image (i.e., the image IMGa) is shot by the first camera 140 under different viewing angles or different positions (e.g., the first camera 140 is higher/lower than the human-related object, or the first camera 140 is on the right/left side relative to the human-related object).

The relative motion is determined on both the camera pose (analyzed from the pose data from the motion sensor 120) and the object pose (analyzed according to the human features from the image IMGa).

Step S312 is executed for providing a pre-defined model mask MSKp (referring to FIG. 4A). The pre-defined model mask MSKp can be stored in the storage unit 182. Similar to aforesaid embodiments, the pre-defined mask MSKp is shaped as a general prototype of a human portrait in common selfie images and designed based on experiences, machine-learning or statistics.

Step S314 is executed for adjusting the pre-defined model mask into an adaptive model mask (referring to adaptive model mask MSKa1~MSKa3 in FIG. 4B~4D) according to the relative motion by the adaptive segmentation unit 164.

If the relative motion indicates that the first camera 140 is moved downward relatively to the human (shooting from a lower position relative to the foreground object OBJ), the pre-defined mask MSKp is adjusted into the adaptive model mask MSKa1 shown in FIG. 4B.

If the relative motion indicates that the first camera 140 is moved upward relatively to the human (shooting from a higher position relative to the foreground object OBJ), the pre-defined mask MSKp is adjusted into the adaptive model mask MSKa2 shown in FIG. 4C.

If the relative motion indicates that the first camera 140 is moved to the right side relative to the human (shooting from a right side relative to a central axis in front of the foreground object OBJ), the pre-defined mask MSKp is adjusted into the adaptive model mask MSKa3 shown in FIG. 4D.

The step S314 of adjusting the pre-defined model mask MSKp into the adaptive model mask MSKa1~MSKa3 is similar to the step S206 in FIG. 2 in aforesaid embodiments. The main difference is that the step S314 is performed according to the relative motion, while the step S206 is performed according to the pose data POS.

Step S316 is executed for adaptively extracting the foreground object OBJ from the image IMGa according to the adaptive model mask by the adaptive segmentation unit 164.

After the foreground object OBJ (e.g., the user's portrait) is extracted by the adaptive segmentation unit 164, the foreground object OBJ can be utilized in different types of visual effects, such as an image blending effect or other effects. In some embodiments of the method 300, a step is further executed for capturing another image IMGb by the second camera 180 simultaneously to the image IMGa captured by the first camera 140. In some embodiments of the method 200, another step is further executed for blending the foreground object OBJ from the image IMGa captured by the first camera 140 into the image IMGb captured by the second camera 180.

Because both of the object pose and the camera pose are dynamically changed in the time sequences, the method 300 adapts the relative motion between the object pose and the camera pose, so as to depart the human object from the selfie image as the foreground object OBJ in real time. Then the user can aim to add the visual effect on the foreground object OBJ efficiently in preview stage.

In addition, in order to make the visual effect more natural related to the background provided by the image IMGb captured by the second camera 180, the foreground object OBJ (the human) is blended into the image IMGb at the corresponding position where the foreground object OBJ is originally located within the images IMGa.

Figure 7:
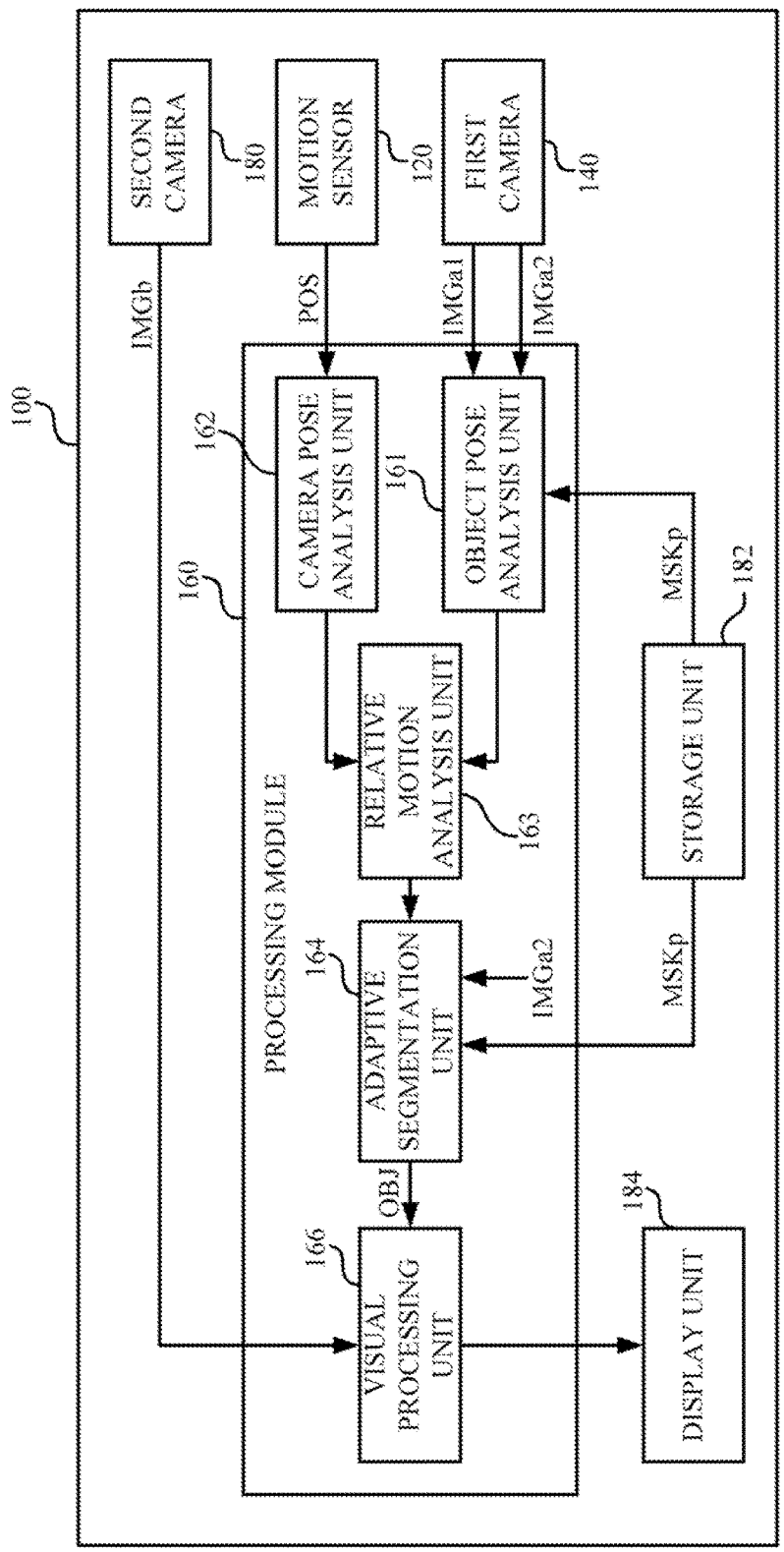
FIG. 7 is a schematic diagram illustrating an electronic apparatus according to another embodiment of the disclosure.

Reference is also made to FIG. 7, which is a schematic diagram illustrating an electronic apparatus 100 according to another embodiment of the disclosure. The electronic apparatus 100 in the embodiment of FIG. 7 is similar to the embodiment of FIG. 5. Therefore, detail components of the electronic apparatus 100 are not further discussed here.

Figure 8:
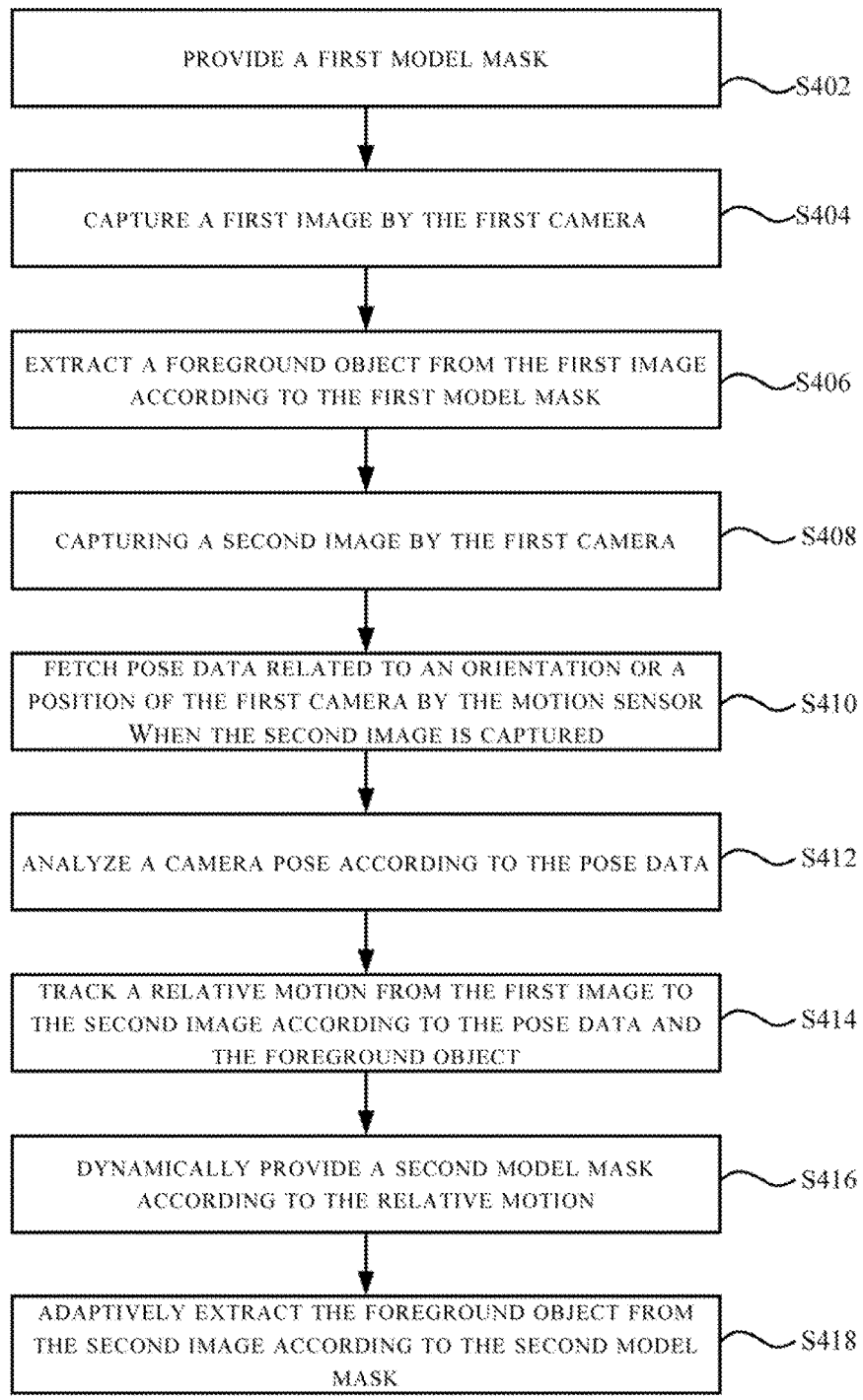
FIG. 8 is a flow chart diagram illustrating the method for segmenting an object from an image with an adaptive model mask according to an embodiment of the disclosure.

The electronic apparatus 100 is suitable to perform a method for segmenting a foreground object from an image with an adaptive model mask. Reference is also made to FIG. 8, which is a flow chart diagram illustrating the method 400 for segmenting a foreground object from an image with an adaptive model mask according to an embodiment of the disclosure. The method 400 in FIG. 8 is suitable to be utilized on the electronic apparatus 100 shown in FIG. 7.

In the embodiment of FIG. 7 and FIG. 8, the first camera 140 is configured to capture an image IMGa1 and another image IMGa2 in sequence. The image IMGa2 is captured after the image IMGa1. The second camera 180 is configured to capture an image IMGb simultaneous to the image IMGa2 captured by the first camera 140.

Step S402 is executed for providing a first model mask. The first model mask is a pre-defined model mask (referring the pre-defined model mask MSKp in previous embodiments). The pre-defined model mask is shaped corresponding to a front view of at least one human. The front view at least covers a head and an upper body of the human. In the case of one human, a right half and a left half of the pre-defined model mask are substantially mirrored to each other. In addition, the method 400 can provide plural pre-defined model masks, which are shaped in different types of humans. The pre-defined model masks are differentiated by a hair style, a weight, a size or a skeleton topology. In other embodiments, the pre-defined model mask(s) is shaped corresponding to a front view of multiple people. In this case, the front view at least covers heads and upper bodies of these people.

Step S404 is executed for capturing the image IMGa1 by the first camera 140. The image IMGa1 comprising a foreground object OBJ (referring to FIG. 3). Step S406 is executed for extracting the foreground object OBJ from the first image according to the first model mask (the pre-defined model mask). Step S408 is executed for the image IMGa2 by the first camera 140. Step S410 is executed for fetching pose data POS from the motion sensor 120. The pose data POS is related to a position and/or an orientation of the first camera 140 when the image IMGa2 is captured. Step S412 is executed for analyzing a camera pose according to the pose data POS by the camera pose analysis unit 162. Step S414 is executed for tracking a relative motion from the image IMGa1 to the image IMGa2 according to the camera pose (or the pose data POS) and the foreground object OBJ extracted from the image IMGa1. Step S416 is executed for dynamically providing a second model mask according to the relative motion. The second model mask is an adaptive model mask (referring to the adaptive model mask MSKa1~MSKa3 in FIG. 4B~4D) formed by adjusting the pre-defined model mask (referring to the pre-defined model MSKp in FIG. 4A) according to the relative motion. The details about how to form the adaptive model mask from the pre-defined model are explained in previous embodiments of FIG. 5 and FIG. 6, and not repeated here. Step S418 is executed for adaptively extracting another foreground object (which is the same human captured in the image IMGa2) from the image IMGa2 according to the second model mask.

The behaviors and technical features of the method 400 are similar to the method 300 in previous embodiments. The main feature in the method 400 is that the pre-defined model mask is utilized to track the human in an earlier image frame (the image IMGa1) for roughly segmenting the foreground object. Afterward, the relative motion is calculated between the camera pose (according to the pose data POS detected by the motion sensor 120) and the foreground object extracted from the earlier image IMGa1. The foreground object in the later image IMGa2 captured by the first camera 140 is extracted according to the adaptive model mask with a better preciseness.

In this document, the term "coupled" may also be termed as "electrically coupled", and the term "connected" may be termed as "electrically connected", "coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, suitable for an electronic apparatus comprising a first camera and a motion sensor, the method comprising:

providing at least one pre-defined model mask;

fetching pose data from the motion sensor, the pose data being related to an orientation or a position of the first camera;

adjusting one of the at least one pre-defined model mask into an adaptive model mask according to the pose data; and extracting an object from an image captured by the first camera according to the adaptive model mask;

wherein the adjusting step comprises at least one of the following:
when the pose data indicates that the first camera is moved downward, the pre-defined model mask is adjusted such that a bypassing area of the adaptive model mask is larger in a lower region and narrower in an upper region;
when the pose data indicates that the first camera is moved upward, the pre-defined model mask is adjusted such that the bypassing area of the adaptive model mask is larger in the upper region and narrower in the lower region; and
when the pose data indicates that the first camera is moved to the right side, the pre-defined model mask is adjusted such that the bypassing area of the adaptive model mask is larger on the right side and narrower on the left side.

2. The method of claim 1, wherein the electronic apparatus further comprises a second camera, the method comprises:
capturing another image by the second camera simultaneous to the image captured by the first camera; and
blending the object from the image captured by the first camera into the image captured by the second camera.

3. The method of claim 2, wherein the first camera and the second camera are disposed on opposite surfaces of the electronic apparatus, the image captured by the first camera is a selfie image.

4. The method of claim 1, wherein the pre-defined model mask is shaped corresponding to a front view of a human, the front view at least covers a head and an upper body of the human, and a right half and a left half of the pre-defined model mask are substantially mirrored to each other.

5. The method of claim 1, wherein plural pre-defined model masks are provided, the pre-defined model masks are shaped in different types of humans, the pre-defined model masks are differentiated by a hair style, a weight, a size or a skeleton topology.

6. The method of claim 1, wherein the pre-defined model mask is shaped corresponding to a front view of multiple people, the front view at least covers heads and upper bodies of these people.

7. The method of claim 1, wherein the pose data fetched from the motion sensor indicates a rotation angle of the orientation of the first camera or a shifting distance of the position of the first camera, the adaptive model mask is calculated from the pre-defined model mask in correspondence with the rotation angle and the shifting distance.

8. A method, suitable for an electronic apparatus comprising a first camera and a motion sensor, the method comprising:
capturing a first image by the first camera;
estimating an object pose from the first image;
fetching pose data from the motion sensor, the pose data being related to a position or an orientation of the first camera when the first image is captured;
analyzing a camera pose according to the pose data;
tracking a relative motion according to the camera pose and the object pose;
providing a pre-defined model mask;
adjusting the pre-defined model mask into an adaptive model mask according to the relative motion; and
adaptively extracting the object from the first image according to the adaptive model mask;
wherein the adjusting step comprises at ;east one of the following:
when the relative motion indicates that the first camera is moved downward, the pre-defined model mask is adjusted such that a bypassing area of the adaptive model mask is larger in a lower region and narrower in an upper region;
when the relative motion indicates that the first camera is moved upward, the pre-defined model mask is adjusted such that the bypassing area of the adaptive model mask is larger in the upper region and narrower in the lower region; and
when the relative motion indicates that the first camera is moved to the right side, the pre-defined model mask is adjusted such that the bypassing area of the adaptive model mask is larger on the right side and narrower on the left side.

9. The method of claim 8, further comprising:
providing a plurality of pre-defined model masks;
selecting one of the pre-defined model masks according to the first image; and
adjusting the selected pre-defined model mask into the adaptive model mask according to the relative motion.

10. The method of claim 9, wherein the pre-defined model masks are shaped in different types of humans, the pre-defined model masks are differentiated by a hair style, a weight, a size or a skeleton topology, in the step of selecting one of the pre-defined model masks according to the first image, the method further comprises:
comparing an object within the first image with at least one of the pre-defined model masks.

11. The method of claim 8, wherein the electronic apparatus further comprises a second camera, the method comprises:
capturing a second image by the second camera simultaneous to the first image captured by the first camera; and
blending the object from the first image captured by the first camera into the second image captured by the second camera.

12. The method of claim 11, wherein the first camera and the second camera are disposed on opposite surfaces of the electronic apparatus, the first image captured by the first camera is a selfie image.

13. The method of claim 8, wherein the pre-defined model masks is shaped corresponding to a front view of multiple people, the front view at least covers heads and upper bodies of these people.

14. The method of claim 8, wherein the relative motion indicates a rotation angle or a shifting distance between the camera pose and the object pose, the adaptive model mask is calculated from the pre-defined model mask in correspondence with the relative motion.

15. A method, suitable for an electronic apparatus comprising a first camera and a motion sensor, the method comprising:
providing a first model mask;
capturing a first image by the first camera, the first image comprising an object;
extracting the object from the first image according to the first model mask;
capturing a second image by the first camera;
fetching pose data from the motion sensor, the pose data being related to a position or an orientation of the first camera when the second image is captured;
tracking a relative motion from the first image to the second image according to the pose data and the object from the first image;

dynamically providing a second model mask according to the relative motion; and adaptively extracting another object from the second image according to the second model mask;

wherein the dynamically providing step comprises at least one of the following:

when the relative motion indicates that the first camera is moved downward, the second model mask is adjusted such that a bypassing area of the adaptive model mask is larger in a lower region and narrower in an upper region;

when the relative motion indicates that the first camera is moved upward, the second model mask is adjusted such that the bypassing area of the adaptive model mask is larger in the upper region and narrower in the lower region;

and when the relative motion indicates that the first camera is moved to the right side, the second model mask is adjusted such that the bypassing area of the adaptive model mask is lamer on the right side and narrower on the left side.

16. The method of claim 15, wherein the electronic apparatus further comprises a second camera, the method comprises:

capturing a third image by the second camera simultaneous to the second image captured by the first camera; and blending the object from the second image captured by the first camera into the third image captured by the second camera.

17. The method of claim 16, wherein the first camera and the second camera are disposed on opposite surfaces of the electronic apparatus, the first image and the second image captured by the first camera are selfie images.

18. The method of claim 15, wherein the first model mask is a pre-defined model mask, the pre-defined model mask is shaped corresponding to a front view of a human, the front view at least covers a head and an upper body of the human, and a right half and a left half of the pre-defined model mask are substantially mirrored to each other.

19. The method of claim 15, wherein plural first model masks are provided, the first model masks are shaped in different types of humans, the first model masks are differentiated by a hair style, a weight, a size or a skeleton topology.

20. The method of claim 15 wherein the first model mask is shaped corresponding to a front view of multiple people, the front view at least covers heads and upper bodies of these people.

* * * * *